United States Patent Office  
3,702,883  
Patented Nov. 14, 1972

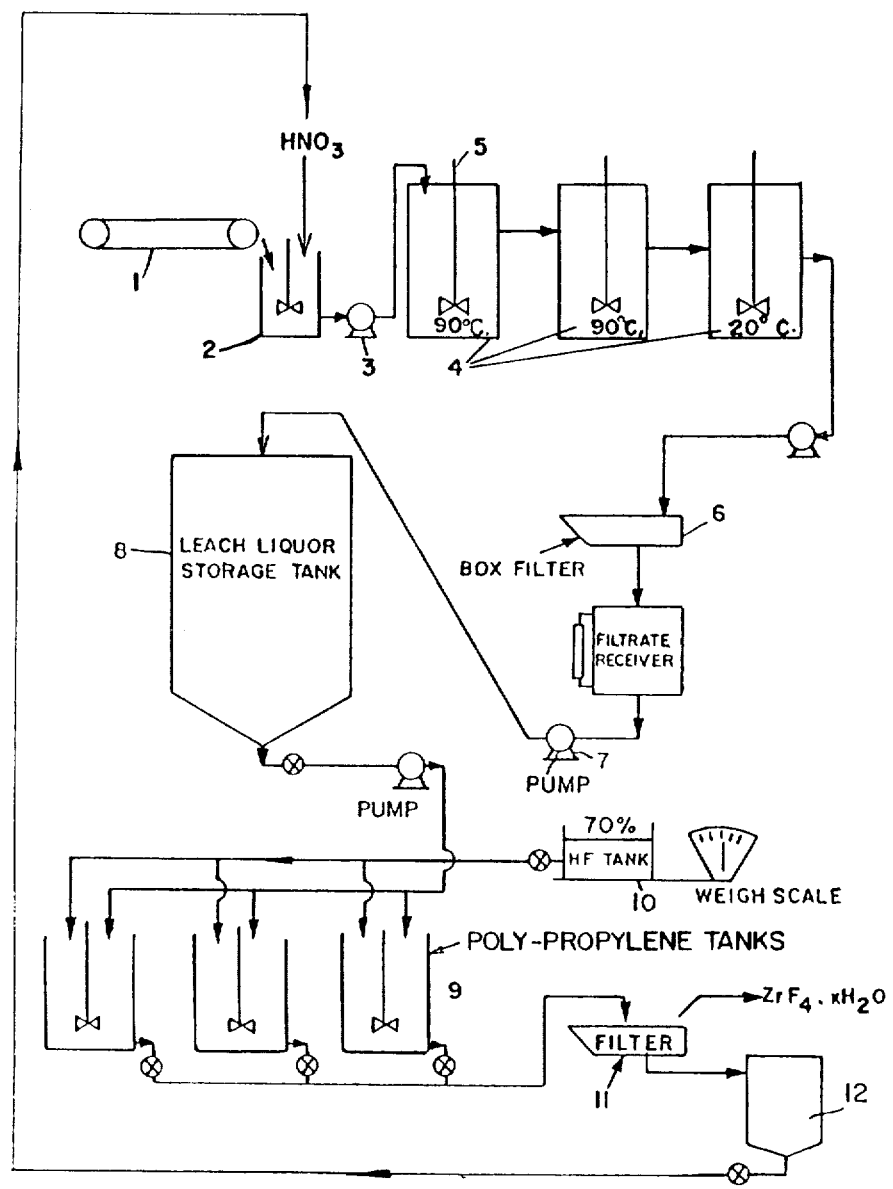

---

3,702,883
ZIRCONIUM TETRAFLUORIDE PROCESS
William J. S. Craigen, Gordon M. Ritcey, and Edwin Glendon Joe, Ottawa, Ontario, and Frank William Melvanin and Bruce C. Smart, Port Hope, Ontario, Canada, assignors to Eldorado Nuclear Limited, Ottawa, Ontario, Canada
Filed Aug. 20, 1970, Ser. No. 65,430
Claims priority, application Canada, Aug. 25, 1969, 60,368
Int. Cl. C22b 59/00
U.S. Cl. 423—82                     16 Claims

ABSTRACT OF THE DISCLOSURE

Anhydrous zirconium tetrafluoride is prepared by precipitating the monohydrate from a clear solution of zirconyl nitrate in at least 8 N nitric acid, by the addition of hydrofluoric acid and the acid solution remaining after the precipitation is used for the preparation of further zirconyl nitrate solution. In contrast to previously known processes for the preparation of zirconium tetrafluoride, the present process gives a product which is readily dehydrated and, with suitable feed, sufficiently pure to be directly converted into nuclear grade zirconium metal. The process is applicable to continuous industrial scale use.

---

BACKGROUND OF THE INVENTION

This invention relates to a process for preparing zirconium tetrafluoride from zirconyl nitrate, and in particular to a process for precipitating zirconium tetrafluoride monohydrate from a solution of zirconyl nitrate by the addition of hydrofluoric acid and subsequently drying and isolating the product. In this process the acid solution remaining after precipitation of the zirconium tetrafluoride monohydrate is reused for the preparation of zirconyl nitrate solution.

Previously known methods of preparing zirconium tetrafluoride, for example by reaction of zirconium tetrachloride with hydrofluoric acid, or by reaction of solid zirconium hydroxide or nitrate with gaseous hydrofluoric acid, or by treatment of solid zirconium oxide or chloride with liquid hydrofluoric acid, suffer from the disadvantages that they give relatively low yield, and the resulting product is unsuitable for direct conversion to nuclear grade zirconium metal.

SUMMARY OF THE INVENTION

In accordance with this invention it has been discovered that anhydrous zirconium tetrafluoride may be prepared by a process which comprises preparing a clear solution of zirconyl nitrate in a nitric acid solution of normality at least 8 and having a zirconium content between about 50 and 150 grams per litre, precipitating therefrom zirconium tetrafluoride monohydrate by the addition of hydrofluoric acid at a temperature of at least 30° C., isolating and drying the precipitated zirconium tetrafluoride, and using acid solution remaining after precipitation for the preparation of the zirconyl nitrate solution. Metallic impurities such as titanium or uranium salts which are of higher solubility than zirconium tetrafluoride remain in solution and therefore for continuous operation the recycling of the acid solution remaining after precipitation must be accompanied by a bleed to prevent too great a build-up of impurities. This removal of a portion of the reused acid not only prevents metallic impurities from building up, but also is used, where the feed material is zirconyl nitrate, to prevent the nitrate ion concentration from becoming excessively high. Greater than 90% recovery of the metal ion from solution may be obtained by this process.

In this specification, the term "zirconyl nitrate" is used to cover also products which may include or even consist primarily of zirconium tetranitrate, etc., since it is difficult or impossible in many cases to determine the precise nature of the nitrate.

BRIEF DESCRIPTION OF THE DRAWING

The drawing is a flow diagram of a preferred embodiment of a process according to this invention when carried out in a continuous manner.

DESCRIPTION OF THE PREFERRED EMBODIMENTS

The temperature during the precipitation reaction should, as mentioned, be not less than 30° and in a preferred embodiment is between 40–60° C. However, no heating is normally necessary since the addition of the hydrofluoric acid causes an exothermic reaction and the temperature generally rises above 30° C. In fact, cooling may be necessary. The hydrofluoric acid used should preferably be substantially anhydrous. It is also preferable to add the hydrofluoric acid to the zirconyl nitrate solution in a substantially stoichiometric amount. In a further preferred embodiment of the invention the clear solution of zirconyl nitrate is prepared at 10 to 12 N with respect to nitric acid.

Drying of the precipitated wet $ZrF_4 \cdot H_2O$ crystals is carried out in one or more stages at temperatures in the 200° to 500° C. range, but preferably between 250° and 325° C. in order to ensure substantially complete nitrate removal and dehydration. High drying temperatures should be avoided since they reduce the reactivity of the product and make conversion in the polishing step described below, more difficult. A nitric acid wash (preferably with 10 N nitric acid) is recommended on the wet $ZrF_4 \cdot H_2O$ crystals to remove any entrained zirconyl nitrate. The employment of this step ensures complete nitrate removal at relatively low drying temperatures and results in less stringent polishing conditions being required. It also prevents corrosion problems in the polishing step due to the presence of residual nitrate. If, however, a nitric acid wash is not employed and entrained zirconyl nitrate is present in the crystals, nitrate removal is not complete at lower drying temperatures.

Drying time required varies depending upon the contact efficiency of the drying equipment used, and the total nitric acid and free moisture content of the wet feed. The latter is usually in the 10 to 30% range. Retention time above 275° C. at least in the initial stages of drying while moisture is still present, is held to a minimum to prevent excessive hydrolysis of the fluoride to oxyfluoride.

Drying can be carried out either batchwise or continuously in conventional drying equipment. For continuous drying either a rotary kiln or a fluid bed, for instance, dryer may be used. Because of the corrosiveness of the highly acid vapours, polytetrafluoroethylene (PTFE) or equivalent plastics are preferred for temperatures up to 250° C., and type 400 series stainless steel (442 or 446 preferred) for temperatures above 250° C., to prevent impurity pickup in the product.

Any dry gas such as air or nitrogen can be used as a carrier medium for drying. Gaseous hydrogen fluoride can also be added in the drying operation to assist dehydration and nitrate removal, reduce the amount of hydrolysis taking place, and decrease the temperature requirements for polishing, and to some extent for drying. The addition of HF, however, leads to very severe corrosion and consequent contamination problems in many metallic systems where HF, $HNO_3$ and $H_2O$ are also present and temperatures are about 100° C. or over, and makes recovery and recycle of the acid vapours more difficult. However HF can be utilized in the drying operation without corrosion problems if the equipment is PTFE or its equivalent, and temperatures are limited to 250° C.

For greater efficiency the drying system may also incorporate recovery and recycle of the acid vapours to the acid filtrate from $ZrF_4 \cdot H_2O$ precipitation.

The $ZrF_4$ product after drying in the preferred manner indicated above has a residue on sublimation (equivalent $ZrO_2$) of 5% or less, contains little or no $ZrF_4 \cdot H_2O$ and <50 p.p.m. $NO_3$. If HF is added during the drying operation the equivalent $ZrO_2$ content can be reduced to 2% or less.

The $ZrF_4$ product may then be polished, the term "polishing" being used to describe the final gaseous HF treatment of the dried crude $ZrF_4$. The purpose of this step is to remove the last traces of moisture, convert any oxides or oxyfluorides to $ZrF_4$ and increase the stability and density of the product.

Polishing is best carried out in one or more stages in the temperature range 300° to 700° C. in a high concentration of HF. A two stage system is preferred with temperatures of 300° to 500° C., particularly 400° to 500° C., in the first stage and 500° to 650°, particularly 500° to 600° C., in the second stage. It is preferred to use a 100% stoichiometric excess of HF (based on $ZrO_2$ content). Temperatures above 600° C. can be used in the second stage, but pose problems due to equipment corrosion, and a relatively high $ZrF_4$ vapor pressure.

Time requirements for polishing are again dependent upon the efficiency of gas-solids contact in the equipment used, the HF concentration, and the properties of the feed, (equivalent $ZrO_2$ content, moisture content and particularly reactivity, the last property being in turn dependent on drying time and temperature). Generally retention times in the half hour to three hour range are adequate.

Either batch wise or continuous processing can be used in the polishing process. A vertical multi-hearth or fluid bed reaction may be used for continuous processing and a horizontal or vertical tray reactor for batch processing. HF is preferably introduced counter current to the $ZrF_4$ feed for continuous processing, with a stoichiometric excess of HF usually in the 10 to 30% range and temperatures in the 450° to 600° C. range for efficient polishing. For batch operation the excess used is preferably much higher. Bed depths should be limited to about ½ inch maximum for good gas-solids contact. A slight back pressure, obtained by restricting the off-gas flow, is beneficial during batch polishing.

A high HF concentration e.g. of up to 50 volume percent, is required during polishing to effect complete conversion of oxides or oxyfluorides to fluorides. Tests in a fluid bed unit showed that greater dilutions of the HF with the fluidizing gas tended to result in incomplete conversion.

In general the following statements summarize the polishing requirements discovered in the process of the present invention, for producing an anhydrous oxygen free product.

(1) The higher the HF concentration the shorter the retention time required, and the higher the temperature that can be effectively used for polishing.

(2) The higher the equivalent oxide content, or poorer the reactivity of the dried feed, the longer the retention time for polishing and the higher the finishing temperature required.

Finally, stabilizing is desirable to reduce the hydroscopicity of the product, and allow normal handling without humidity control. A temperature of 600° C., using a dry inert gas purge to remove entrained HF, is preferably employed to stabilize the product before cooling. The time and temperature required for stabilizing is dependent upon the finishing temperature during polishing. The lower the finishing temperature in HF, the longer the retention time and higher the temperature required for stabilizing. Thus if the HF finishing temperature is 600° C. stabilizing requires only a short dry inert gas purge at or near this temperature. On the other hand, an inert gas purge at 650° C. allows the use of lower temperatures in the polishing step, i.e. down to 400° C. or even less.

The solution of zirconyl nitrate used in the above described process is prepared by dissolving zirconium feed material in nitric acid which preferably also contains 1 to 5% hydrofluoric acid. The nitric acid used must be at least 8 normal and preferably 10 to 12 normal. The zirconyl nitrate solution so formed should contain the metal nitrate in concentrations up to nearly saturation i.e. zirconium in the 50 to 150 grams per liter range, preferably around 100 grams per liter. A clear zirconyl nitrate solution is required for the process; the zirconyl nitrate solution formed by the above method, particularly where HF is present, is usually clear and does not normally require filtration. The re-used acid from the $ZrF_4 \cdot H_2O$ precipitation step normally contains sufficient HF.

The term "zirconium feed" used herein is defined as solid zirconium oxide, zirconium hydroxide or zirconyl nitrate, or a zirconyl nitrate solution such as an aqueous strip liquor from an organic solvent extraction or zirconyl nitrate solution. If zirconium oxide or hydroxide are used these are first dissolved in nitric acid to give a dilute solution of zirconyl nitrate. The nitrate may then be extracted using a suitable solvent such as tributylphosphate inter alia to reduce the hafnium content and the resulting strip liquor (which comprises 2 to 4 normal nitric acid and about 60 grams per litre zirconium) concentrated by evaporation to at least 8 normal nitric acid. Occasionally it is possible to evaporate the dilute aqueous zirconyl nitrate strip liquor down to the required concentration i.e. 8 to 14 normal nitric acid and around 100 grams per litre zirconium for the reaction with hydrofluoric acid; however in general the strip liquor must be evaporated down to zirconyl nitrate crystals which are then redissolved in nitric acid to the required concentration. The zirconyl nitrate crystals produced by evaporation of the strip liquor have excellent filterability, contain about 33% zirconium and 45% $NO_3$ and readily dissolve in water or in the re-used acid from $ZrF_4 \cdot H_2O$ precipitation.

The above described conditions for the preparation of a clear zirconyl nitrate solution and the subsequent precipitation of zirconium tetrafluoride monohydrate by the addition of hydrofluoric acid to the zirconyl nitrate solution, are so designed to produce substantially only the monohydrate and to prevent formation of the trihydrate or oxyfluoride. Zirconium trihydrate should be avoided as far as possible since it leads to more hydrolysis in the drying stage and therefore makes production of the anhydrous tetrafluoride more difficult. Also, formation of zirconium oxyfluoride should be inhibited since this is difficult to handle in the drying and polishing stages, and the presence of either the oxyfluoride or the trihydrate tends to give a product contaminated with $ZrO_2$ or $ZrOF_2$.

Thus the process of the present invention possesses advantages over previously known processes since it enables the production of zirconium tetrafluoride in high yield, and the product can be easily prepared anhydrous, stable, oxygen-free and with a hafnium content near or below the allowable impurity level for the production of nuclear cladding material. Thus the invention can provide zirconium tetrafluoride of sufficiently high purity for use in the production of zirconium metal to be used as a cladding or alloying material for uranium in the manufacture of nuclear reactor fuel elements. Pure hafnium-free zirconium is a valuable structural material for atomic reactors because of its low nuclear cross-section and high corrosion and heat-resistance. A further advantage of the present invention is that it provides a process applicable to continuous industrial scale use for the preparation of anhydrous zirconium tetrafluoride suitable for direct conversion to nuclear grade zirconium metal.

The overall process of the present invention is described in detail below with reference to the exemplified process which is not to be regarded as in any way limiting, and by reference to the drawing. In the exemplified process zirconium hydroxide is used as the feed material.

Example 1

Wet zirconium hydroxide was fed by a variable speed rubber belt feeder 1 at the rate of 40 pounds per hour to a type 316 stainless steel acid digestion tank 2. Recycle nitric acid containing some hydrofluoric acid at 181 lb. per hour (61.5 wt. percent) was added to the digestion tank by gravity feed from an acid tank 12. The resultant slurry (heated to 60° C. by the acid) was pumped through a diaphragm pump 3 to a cascade of three stainless steel leaching tanks 4. The baffled tanks were heated by internal steam coils to 90° C. and mixing was effected by variable speed stainless steel turbine mixers 5. With 50% of the tank height as free board, the retention time of leaching was approximately 3 hours.

The leached slurry was discharged by gravity on to a stainless steel box filter 6. The filter was covered with a tightly woven polyester cloth which was further coated by one half inch thickness of diatomaceous earth. Vacuum was applied and the filtrate was pumped by a stainless steel centrifugal pump 7 to a holding tank 8.

Periodically, 40 gallon batches of the filtrate were pumped to one of three polypropylene tanks 9. Hydrofluoric acid (70 wt. percent) was added on a batch basis in stoichiometric quantities to precipitate zirconium tetrafluoride. The acid was added through a vacuum manifold system from drums of hydrofluoric acid 10 mounted on weight scales. Mixing in the precipitation tanks was done by variable speed polypropylene turbine impellers. After 2 hours retention time, the precipitate slurry was filtered on a stainless steel pan filter 11 covered with polyester cloth. The granular precipitate of $ZrF_4 \cdot H_2O$ was stored in polyethylene lined steel drums. The acid solution remaining was then recycled to the acid digestion tank 2 for further dissolution of the zirconium hydroxide.

A total of 14,632 pounds of wet zirconium hydroxide, containing 3,746 pounds of zirconium, was treated in this way to yield 5,818 pounds of $ZrF_4 \cdot H_2O$. The high yields obtainable by the novel process are indicated by the complete material balance of the above exemplified process:

ZIRCONIUM BALANCE

Entry—14,632 lb. $Zr(OH)_4 xH_2O$ at 25.6% Zr

| | Zr basis |
|---|---|
| Zirconium content of original feed _____lb__ | 3,746 |
| Pregnant liquor $(ZrO(NO_3)_2 \cdot xH_2O$ _____lb__ | 3,165 |
| Leach efficiency _____percent__ | 84.5 |
| Barren solution _____lb__ | 306 |
| Precipitation efficiency _____percent__ | 90.1 |
| Product as $ZrF_4 \cdot H_2O$ _____lb__ | 2,851 |

The zirconium tetrafluoride monohydrate was then subsequently dried in 2 stages, the first stage at about 200° C. and the second stage at about 300° to 325° C. The product after drying was then polished by heating in a high concentration of hydrogen fluoride initially at a temperature of about 400° C. and subsequently raising the temperature in the second stage of polishing to around 600° C. Finally the product was stabilized by heating at about 600° C. whilst purging with a dry inert gas in order to remove any entrained hydrogen fluoride.

Evaluation of the polished and stabilized product was carried out using X-ray diffraction, residue on sublimation and nitrate analysis. Stability was measured by determining the weight change on exposure to air at 50% relative humidity.

A good high purity anhydrous stable $ZrF_4$ was produced by this process, and is shown to have an equivalent $ZrO_2$ content equal to or less than 0.3% (0.08% oxygen) with metallic impurity levels near or below the allowable levels for use in nuclear reactors, and a maximum weight pick-up on exposure of 0.01% per hour.

Example 2

By the same process as descrbied in Example 1 a total of 1,993 pounds of dried zirconium hydroxide, containing 997 pounds of zirconium, was treated to yield 1,535 pounds of zirconium tetrafluoride monohydrate. The leach efficiency of this process was 80.1% and the precipitation efficiency of the tetrafluoride was 94.2%. The precipitated wet monohydrate was then subsequently dried, polished and stabilized as described in Example 1.

What we claim as our invention is:

1. A process for preparing anhydrous zirconium tetrafluoride which comprises preparing a clear solution of zirconyl nitrate in a nitric acid solution of normality at least 8 and having a zirconium content between about 50 and 150 grams per litre, precipitating at a temperature of at least 30° C. therefrom, zirconium tetrafluoride monohyrate by the addition of hydrofluoric acid, isolating and drying the precipitated zirconium tetrafluoride, and using acid solution remaining after precipitation for the preparation of the zirconyl nitrate solution.

2. A process as claimed in claim 1 when carried out in a continuous manner, sufficient of said acid solution being bled off to prevent buildup of impurities and nitrate ion.

3. A process as claimed in claim 1 wherein the solution of zirconyl nitrate is prepared by dissolving to the required zirconium concentration a zirconium feed material selected from the group comprising solid zirconium oxide, hydroxide or nitrate, in nitric acid of normality at least 8 and containing about 1 to 5% hydrofluoric acid.

4. A process as claimed in claim 1 wherein the solution of zirconyl nitrate is prepared by evaporating to the required zirconium concentration and acid normality a dilute aqueous solution of zirconyl nitrate obtained by solvent extraction of a solution obtained by dissolving zirconium feed material selected from the group comprising solid zirconium oxide, hydroxide or nitrate, in nitric acid of normality at least 8 and containing about 1 to 5% hydrofluoric acid.

5. A process as claimed in claim 2 wherein the solution of zirconyl nitrate is prepared by evaporating to the required zirconium concentration and acid normality a dilute aqueous solution of zirconyl nitrate obtained by solvent extraction of a solution obtained by dissolving zirconium feed material selected from the group comprising solid zirconium oxide, hydroxide or nitrate, in nitric acid of normality at least 8 and containing about 1 to 5% hydrofluoric acid.

6. A process as claimed in claim 1 wherein the hydrofluoric acid is added to a clear solution of zirconyl nitrate in 10 to 12 N nitric acid.

7. A process as claimed in claim 1 wherein the hydrofluoric acid is substantially anhydrous.

8. A process as claimed in claim 1 wherein hydrofluoric acid is added in a substantially stoichiometric amount.

9. A process as claimed in claim 2 wherein the hydrofluoric acid is substantially anhydrous and is added to a clear solution of zirconyl nitrate in 10 to 12 N nitric acid, in a substantially stoichiometric amount.

10. A process as claimed in claim 1 wherein the precipitation of zirconium tetrafluoride monohydrate is carried out at a temperature between about 50° and 60° C.

11. A process as claimed in claim 1 wherein the precipitated zirconium tetrafluoride is dried in a temperature range of about 250° to 325° C. and is subsequently heated in concentrated hydrogen fluoride atmosphere initially in the temperature range of about 300° to 500° C. and finally at a temperature between about 500° and 600° C.

12. A process as claimed in claim 2 wherein the precipitation of zirconium tetrafluoride monohydrate is carried out at a temperature between about 50° and 60° C., and wherein the precipitated zirconium tetrafluoride is dried in a temperature range of about 250° to 325° C. and is subsequently heated in concentrated hydrogen fluoride atmosphere initially in the temperature range of about 300° to 500° C. and finally at a temperature between about 500° and 600° C.

13. A process as claimed in claim 1 wherein the precipitated wet zirconium tetrafluoride monohydrate crystals, prior to drying, are washed with nitric acid the normality of which is at least 10.

14. A process as claimed in claim 12 wherein the precipitated wet zirconium tetrafluoride monohydrate crystals, prior to drying, are washed with nitric acid the normality of which is at least 10.

15. A process as claimed in claim 12 wherein after heating in a hydrogen fluoride atmosphere the product is subsequently stabilized by heating at about 500° to 650° C. whilst purging with a dry inert gas.

16. A continuous process for preparing anhydrous zirconium tetrafluoride which comprises preparing a clear acid solution of zirconyl nitrate at least 8 normal with respect to nitric acid and having a zirconium content of between about 50 and 150 grams per litre, precipitating therefrom at a temperature of at least 30° C. zirconium tetrafluoride monohydrate by the addition of substantially anhydrous hydrogen fluoride, isolating the precipitated material, drying same at a temperature in the range of 250° to 325° C., polishing the dried material by subjecting same to treatment with anhydrous gaseous hydrogen fluoride at a temperature within the range 400° to 600° C. stabilizing the polished material by purging same with a dry inert gas at a temperature of about 500° to 650° C., and recycling acid solution resulting from the precipitation step for the preparation of the clear acid zirconyl nitrate solution.

References Cited

UNITED STATES PATENTS

| | | | |
|---|---|---|---|
| 2,789,882 | 4/1957 | Sprague | 23—23 |
| 3,193,346 | 7/1965 | Klimaszewski | 23—23 |

OSCAR R. VERTIZ, Primary Examiner

S. B. SHEAR, Assistant Examiner

U.S. Cl. X.R.

423—489